(12) United States Patent
Kawai et al.

(10) Patent No.: US 8,867,846 B2
(45) Date of Patent: Oct. 21, 2014

(54) METHOD AND DEVICE FOR GENERATING IMAGE-PROCESSING COMPONENT DATA USED FOR IMAGE RECOGNITION OF A COMPONENT BY COMPONENT MEASUREMENTS

(75) Inventors: Takayoshi Kawai, Okazaki (JP); Mitsutaka Inagaki, Anjo (JP)

(73) Assignee: Fuji Machine MFG. Co. Ltd., Chiryu-shi (JP)

( * ) Notice: Subject to any disclaimer, the term of this patent is extended or adjusted under 35 U.S.C. 154(b) by 136 days.

(21) Appl. No.: 13/070,903

(22) Filed: Mar. 24, 2011

(65) Prior Publication Data

US 2011/0243456 A1    Oct. 6, 2011

(30) Foreign Application Priority Data

Mar. 30, 2010   (JP) ................................. 2010-079425

(51) Int. Cl.
| | | |
|---|---|---|
| G06K 9/46 | (2006.01) | |
| G06T 7/00 | (2006.01) | |
| G06K 9/62 | (2006.01) | |

(52) U.S. Cl.
CPC ..... *G06K 9/6253* (2013.01); *G06T 2207/30148* (2013.01); *G06T 7/001* (2013.01)
USPC ....................................................... 382/203

(58) Field of Classification Search
None
See application file for complete search history.

(56) References Cited

U.S. PATENT DOCUMENTS

| | | | | |
|---|---|---|---|---|
| 5,517,421 | A * | 5/1996 | Jimbo et al. ................... | 716/103 |
| 2003/0161504 | A1* | 8/2003 | Inoue ............................. | 382/115 |
| 2005/0002562 | A1* | 1/2005 | Nakajima et al. .............. | 382/159 |
| 2009/0198464 | A1* | 8/2009 | Clarke et al. ................... | 702/82 |
| 2011/0001973 | A1* | 1/2011 | Polidor et al. ................. | 356/393 |

FOREIGN PATENT DOCUMENTS

| | | |
|---|---|---|
| JP | 05-251898 A | 9/1993 |
| JP | 07-326900 A | 12/1995 |
| JP | 09-167237 A | 6/1997 |

* cited by examiner

*Primary Examiner* — Jason M Repko
*Assistant Examiner* — Jhere Rowland
(74) *Attorney, Agent, or Firm* — Foley & Lardner LLP

(57) ABSTRACT

Disclosed is a method of generating image-processing component data which is used when an image of a component to be mounted by a component mounting apparatus is recognized. The method includes extracting first component shape data from CAD data of the component, measuring second component shape data from an image of the component obtained by an imaging device, and generating image-processing component data based on the first and second component shape data.

5 Claims, 5 Drawing Sheets

COMPONENT SHAPE DATA

| NUMBER | NAME | DEFINITION |
|---|---|---|
| (1) | Body Length X | Length A of component body in X-direction |
| (2) | Body Width Y | Length B of component body in Y-direction |
| (3) | Length Tolerance X | Allowable length of component body in X-direction |
| (4) | Length Tolerance Y | Allowable length of component body in Y-direction |
| (5) | Lead Position X | Position of lead in X-direction |
| (6) | Lead Position Y | Position of lead in Y-direction |
| (7) | Lead Quantity | Number of leads at target side |
| (8) | Lead Pitch | Interlead spacing C at target side |
| (9) | Lead Width | Width D of lead at target side |
| (10) | Lead Length | Length E of lead at target side |
| (11) | Pitch Tolerance | Allowable interlead pitch |
| (12) | Width Tolerance | Allowable width of lead |
| (13) | Length Tolerance | Allowable length of lead |
| (14) | Center Tolerance | Allowable bend of lead |

| COMPONENT SHAPE DATA |||
|---|---|---|
| NUMBER | NAME | DEFINITION |
| (1) | Body Length X | Length A of component body in X-direction |
| (2) | Body Width Y | Length B of component body in Y-direction |
| (3) | Length Tolerance X | Allowable length of component body in X-direction |
| (4) | Length Tolerance Y | Allowable length of component body in Y-direction |
| (5) | Lead Position X | Position of lead in X-direction |
| (6) | Lead Position Y | Position of lead in Y-direction |
| (7) | Lead Quantity | Number of leads at target side |
| (8) | Lead Pitch | Interlead spacing C at target side |
| (9) | Lead Width | Width D of lead at target side |
| (10) | Lead Length | Length E of lead at target side |
| (11) | Pitch Tolerance | Allowable interlead pitch |
| (12) | Width Tolerance | Allowable width of lead |
| (13) | Length Tolerance | Allowable length of lead |
| (14) | Center Tolerance | Allowable bend of lead |

FIG. 3

METHOD AND DEVICE FOR GENERATING IMAGE-PROCESSING COMPONENT DATA USED FOR IMAGE RECOGNITION OF A COMPONENT BY COMPONENT MEASUREMENTS

CROSS-REFERENCE TO RELATED APPLICATIONS

This application is based upon and claims the benefit of priority from Japanese Patent Application No. 2010-079425, filed Mar. 30, 2010, the entire contents of which are incorporated herein by reference.

BACKGROUND

1. Technical Field

The present invention relates to a method and a device for generating image-processing component data which is used for image-recognition of components to be mounted by a component mounting apparatus.

2. Related Art

Japanese Patent Application Publication JP-A-H09-167237 discloses one of conventional image-processing component data generating methods. In the publication, a worker manually generates image-processing component data while referring to a product specification or CAD data including dimensions, the number of leads and the like described in a catalog of electronic components. Or images of a component are taken by a camera and processed so that image-processing component data is automatically generated.

An image of a component actually taken by a camera is influenced by the color of the component, an irradiation direction of illumination light, the tolerance of the component or the like. As a result, the dimensions of the image component sometimes differ from those of the actual component. Accordingly, in case of use of image-processing component data manually generated by the worker with reference to the product specification or CAD data, the difference is increased between data of component dimensions measured from an image of the actual component during production and the image-processing component data, resulting in occurrence of size error.

Furthermore, in case of use of image-processing component data automatically generated from the taken component image, dimensions of an image-recognized component are changed by the influences of the color of the component, an irradiation direction of illumination light, the tolerance of the component or the like. This results in a disadvantage that the image-processing component data automatically generated from the taken component image has a lower reliability.

SUMMARY

Therefore, an object of the present invention is to provide an image-processing component data generating method and device in both of which the image-processing component data with a higher reliability can automatically be generated.

To achieve the above and other objects, there is provided a method of generating image-processing component data which is used for image-recognition of a component to be mounted by a component mounting apparatus, the method comprising extracting first component shape data from CAD data of the component; measuring second component shape data from an image of the component obtained by an imaging device; and generating image-processing component data based on the first and second component shape data. Consequently, the image-processing component data can automatically be generated and has a higher reliability than the conventional component data.

In the above-described method, the first and second component shape data are compared with each other. The image-processing component data is generated by use of the second component shape data when a deviation between the first and second component shape data falls within a predetermined range of values. Consequently, even when the second component shape data measured from the obtained image has variations, the image-processing component data can be prevented from being generated by use of the second component shape data exceeding an allowable range of variation, whereupon the reliability of the image-processing component data can further be improved.

Furthermore, a plurality of component shape data is measured from a plurality of obtained images respectively, and the image-processing component data is generated by use of the plurality of component shape data. Consequently, the reliability of the image-processing component data can further be improved.

The plurality of component shape data is statistically processed so that the allowable range of variation (confidential interval) is adjusted based on statistically processed values. Consequently, the accuracy of the allowable range of variation (confidential interval) can be improved.

The second component shape data is measured from the obtained image every time the component is imaged by the imaging device during operation of the component mounting apparatus, so that the process of adjusting the image-processing component data is repeated. This can improve the accuracy in the image-processing component data during operation of the component mounting apparatus.

The image-processing component data has an initial value that is generated based on the CAD data. Consequently, the initial value of the image-processing component data can be generated easily.

BRIEF DESCRIPTION OF THE DRAWINGS

FIG. 3 illustrates an example of component shape data;

DETAILED DESCRIPTION

Figure 1:
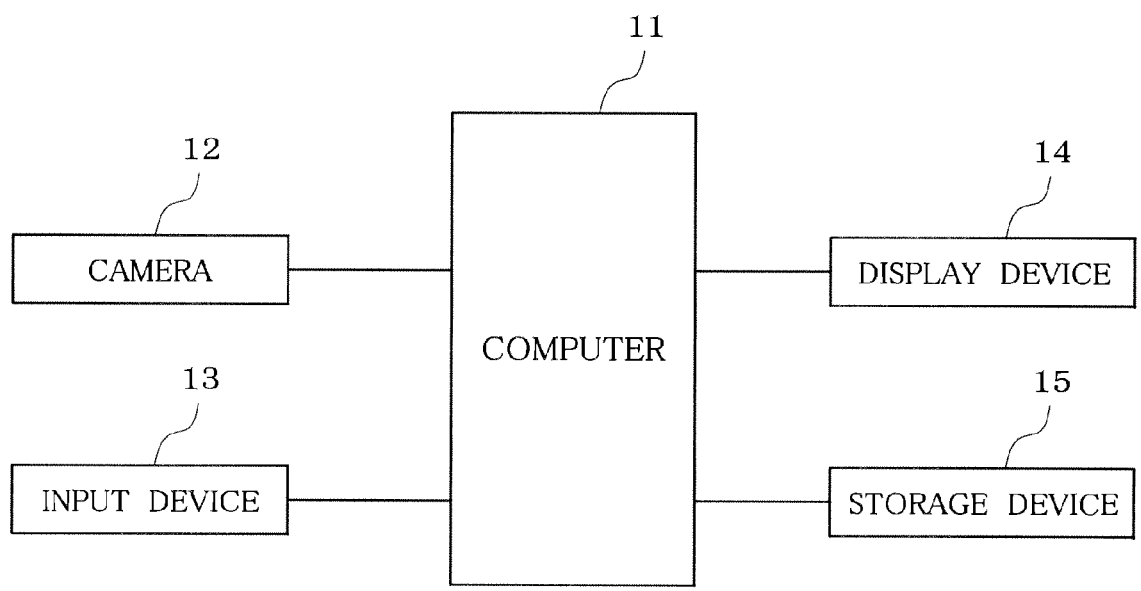
FIG. 1 is a schematic block diagram showing an arrangement of an image-processing component data generating device in accordance with one embodiment.

One embodiment will be described with reference to the accompanying drawings. Referring to FIG. 1, an image-processing component data generating device of the embodiment is shown which comprises a computer 11 such as a personal computer, a camera 12 serving as an imaging device which takes an image of a component or images a component, an input device 13 such as a keyboard, a mouse and the like, a display device 14 such as a liquid-crystal display, CRT or the like and a storage device 15 storing various data and a program for generating image-processing component data, which program will be described later.

The image-processing component data generating device may be configured by making use of a control system of a component mounting apparatus or may be configured into a dedicated image-processing component data generating device (a combination of a desktop imaging device and a personal computer, for example) which is discrete from the control system of the component mounting apparatus. A camera (a component-imaging camera) originally used to image a component stuck to a suction nozzle of the component mounting apparatus, from below, may be used as the camera 12 when the image-processing component data generating device is configured by making use of the control system of the component mounting apparatus.

Figure 5:
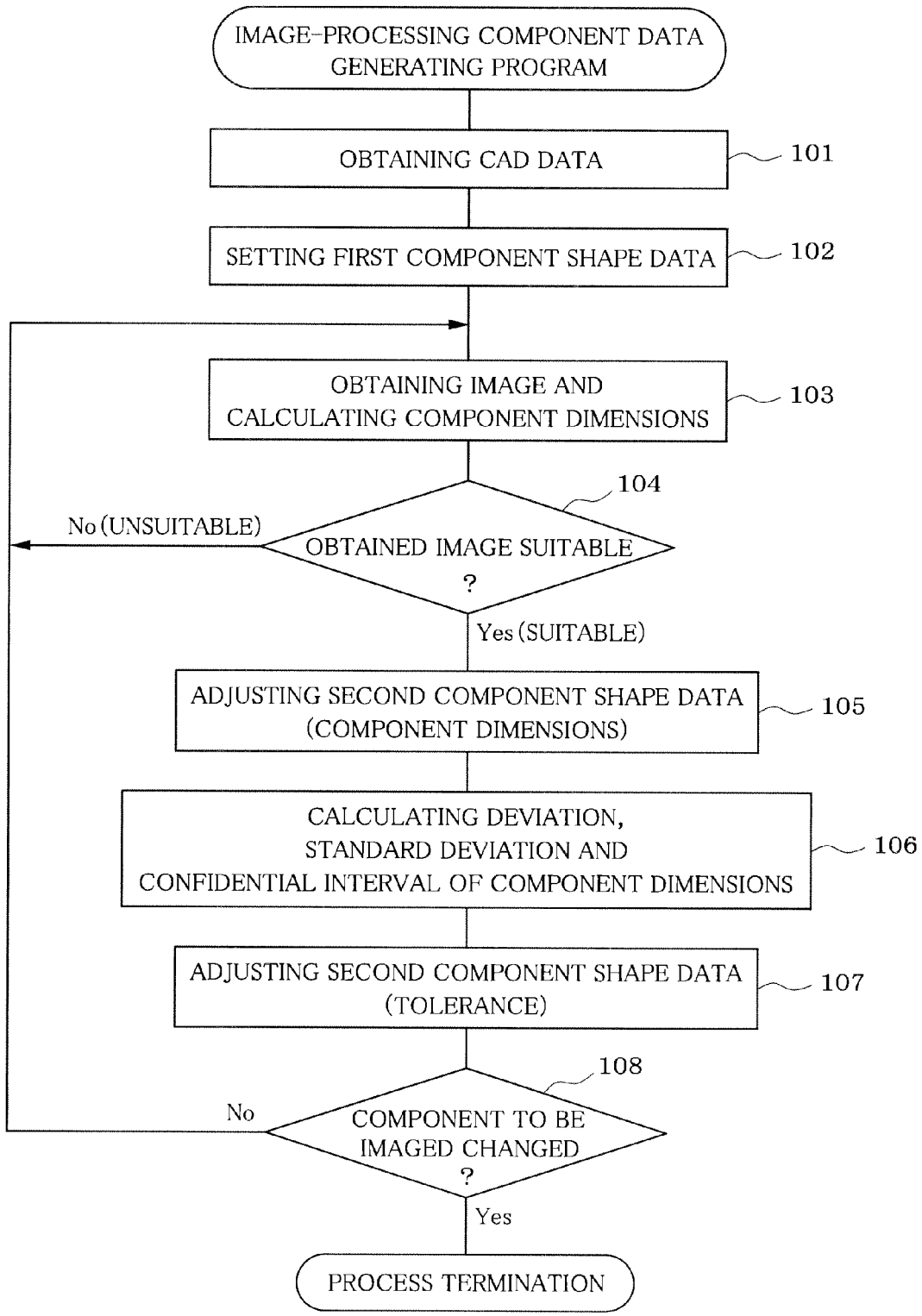
FIG. 5 is a flowchart showing the processing flow of image-processing component data generating program.

The computer 11 executes the image-processing component data generating program as shown in FIG. 5 in a manner as will be described later, thereby extracting first component shape data from CAD data of a component (spec data) and measuring second component shape data from the image obtained by imaging the component by the camera 12, and generating image-processing component data based on the first and second component shape data.

Figure 2:
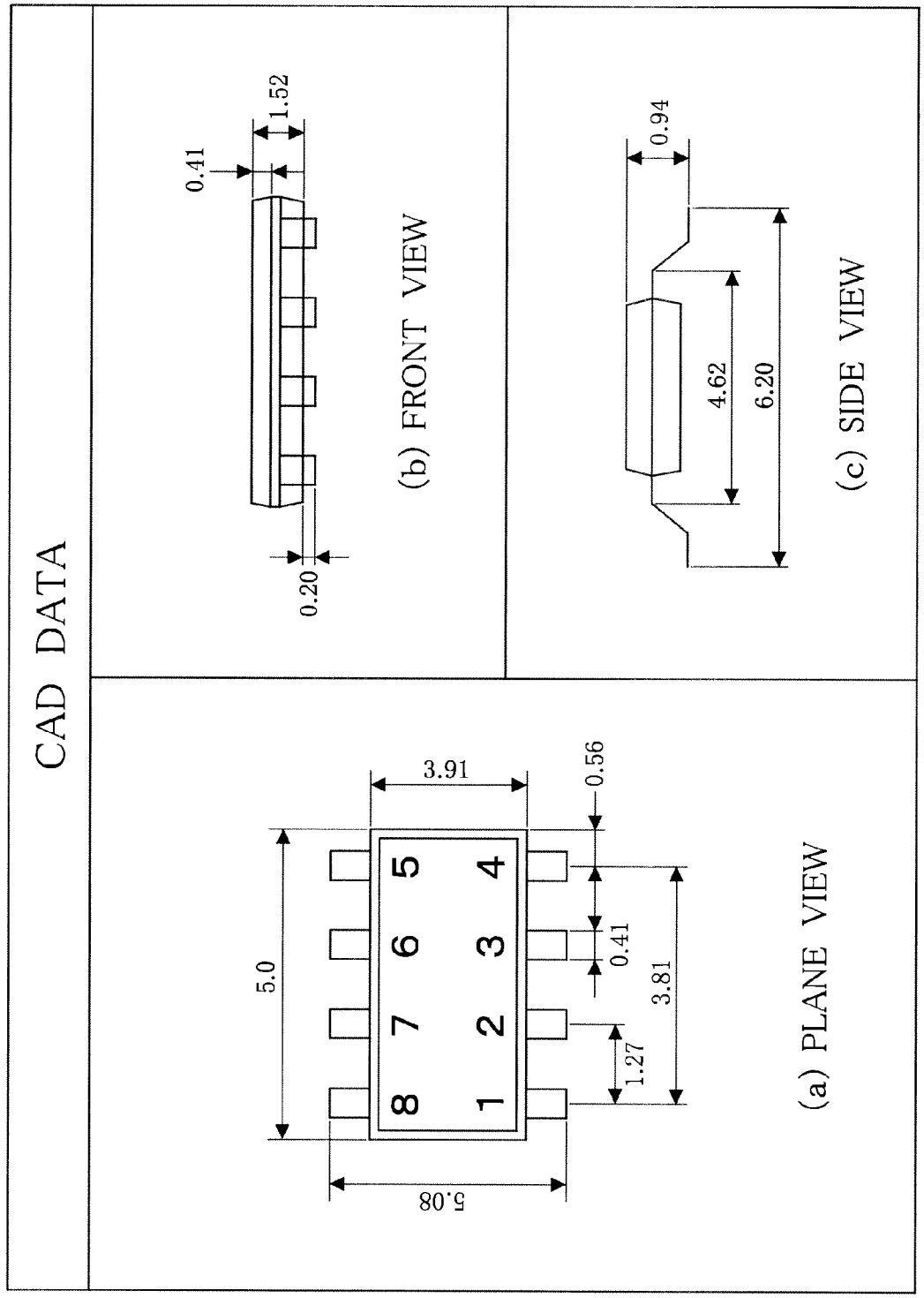
FIG. 2 illustrates an example of CAD data showing plan, front and side views of a component.

An example of CAD data of the component will be described with reference to FIG. 2. FIG. 2 illustrates CAD data of a lead type IC component. The CAD data of FIG. 2 includes data of an outline form of the component and various data of component dimensions inclusive of dimensions of a component body in X- and Y-directions of a component body, interlead spacing or lead pitch, a lead width, a lead length, a position of the lead in the X-direction, a height of the component, etc.

On the other hand, the CAD data and the component shape data measured from an obtained image of the component include data 1 to 14 of the following TABLE 1, for example (see FIG. 3):

TABLE 1

| Number and Name | Definition |
| --- | --- |
| 1 Body Length X | Length A of component body in X-direction |
| 2 Body Width Y | Length B of component body in Y-direction |
| 3 Length Tolerance X | Allowable length of component body in X-direction |
| 4 Length Tolerance Y | Allowable length of component body in Y-direction |
| 5 Lead Position X | Position of lead in X-direction |
| 6 Lead Position Y | Position of lead in Y-direction |
| 7 Lead Quantity | Number of lead at target side |
| 8 Lead Pitch | Interlead spacing C at target side |
| 9 Lead Width | Width D of lead at target side |
| 10 Lead Length | Length E of lead at target side |
| 11 Pitch Tolerance | Allowable interlead pitch |
| 12 Width Tolerance | Allowable width of lead |
| 13 Length Tolerance | Allowable length of lead |
| 14 Center Tolerance | Allowable bend of lead |

In the embodiment, priority is given to the component dimensions of the CAD data in use at start-up of production. In particular, priority is given to the component dimensions of the CAD data regarding body sizes X and Y, and lead pitch, for example.

Furthermore, when a quantity of obtained image to be used for generation of image-processing component data is large (during production, for example), measured data may be averaged or component shape data (component dimensions) may be modified by a proportional (P) control or a proportional integral (PI) control as needed. In this case, allowable values which will be described later may be modified together with the component shape data.

Figure 4:
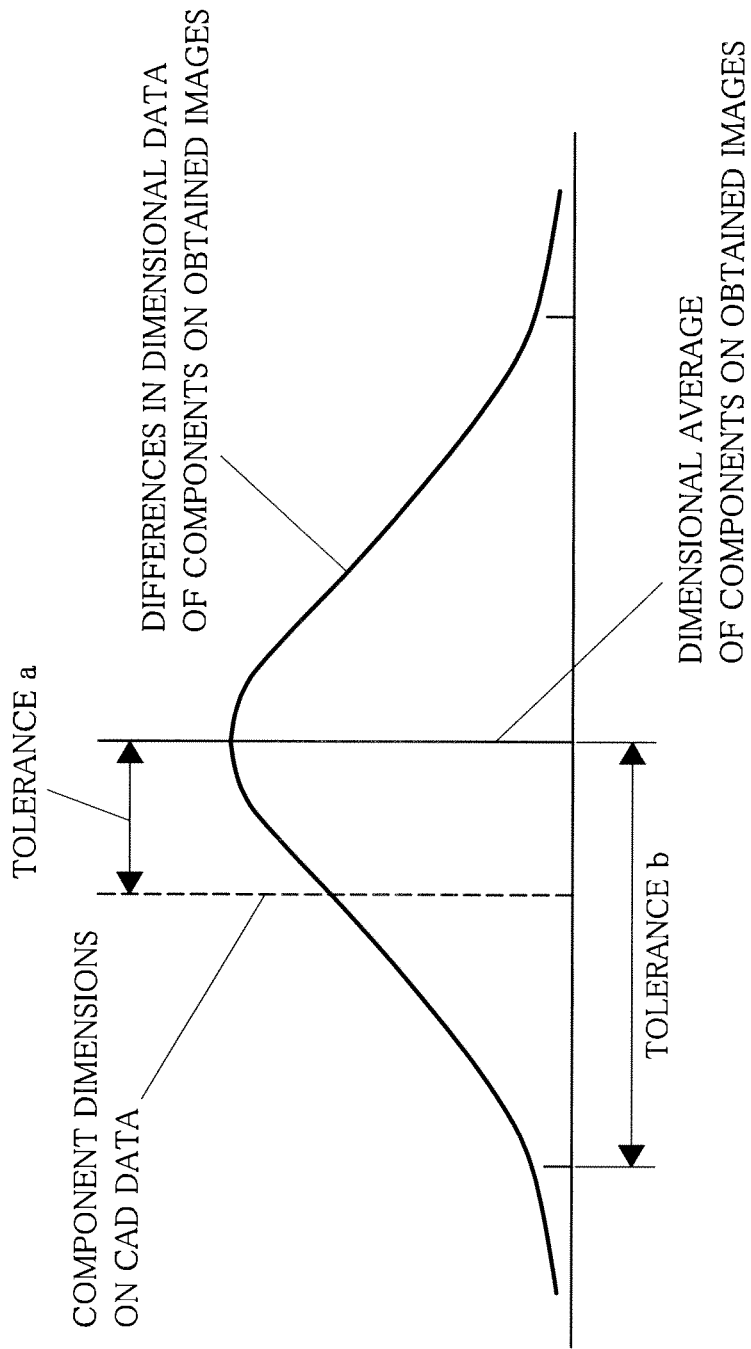
FIG. 4 is a graph explaining a manner of determining an allowable value corresponding to a width of allowable variation range (confidential interval)

The following describes a method of determining a tolerance corresponding to a width of an allowable variation range (a confidential interval), with reference to FIG. 4. FIG. 4 shows the relationship between distribution of component dimension data measured on or obtained from the taken image and the tolerance. Tolerance a in FIG. 4 may be the difference between an average of component dimensions on the taken images and component dimensions on the CAD data. Furthermore, tolerance b may be a predetermined rate of the component dimension on the obtained image, for example, a range containing 90% of the component dimension (90% confidential interval).

Alternatively, a tolerance (a confidential interval) may be adjusted according to, for example, a standard deviation which is obtained by applying a statistic processing to a plurality of component dimension data measured from a plurality of obtained images respectively. For example, the tolerance (the confidential interval) is increased when the standard deviation is larger, whereas the tolerance (the confidential interval) is decreased when the standard deviation is smaller.

Furthermore, the tolerance (the confidential interval) may be adjusted according to percent defective (a scrappage rate) of a component in production, which component is an object to be imaged. For example, the tolerance may range in an 85% confidential interval when the percent defective is 85%.

In the foregoing embodiment, the image-processing component data is generated based on the first component shape data extracted from the CAD data and the second component shape data measured from the image obtained by imaging the component by the camera 12. In this technique, the second component shape data is measured from the image during operation of the component mounting apparatus every time the component is imaged by the camera 12. The adjusting process is executed repeatedly so that the accuracy of the image-processing component shape data is improved. In this case, an initial value of the image-processing component data is generated based on the CAD data. Furthermore, the first and second component shape data are compared with each other so that the image-processing component data is generated with the use of the second component shape data in the case where the deviation between the first and second component shape data falls within a predetermined range of values.

The above-described process of generating the image-processing component data is automatically executed by the computer 11 according to the image-processing component data generating program as shown in FIG. 5. The image-processing component data generating program is executed during operation of the component mounting apparatus (during production). Upon start-up of the program, the computer 11 firstly obtains CAD data of the component to be imaged, from a host computer of higher order (not shown) at step 101. The CAD data may be stored on a storage device 15 of the computer 11 controlling the component mounting apparatus.

Subsequently, the computer 11 proceeds to step 102 to set the first component shape data (body size, lead size and the like) corresponding to the obtained CAD data, while referring to the CAD data. The computer 11 also generates an initial tolerance based on the CAD data. On this occasion, the computer 11 sets the initial tolerance to a predetermined rate of the CAD data, for example, ±10%.

The computer 11 then proceeds to step 103 to image a component trapped by an adsorption nozzle of the component mounting apparatus thereby to obtain an image of the component. The computer 11 applies image-processing to the obtained image thereby to calculate component dimensions.

Thereafter, the computer 11 proceeds to step 104 to compare the component dimensions measured from the obtained image and the component dimensions extracted from the CAD data. The computer 11 determines whether or not the currently obtained image is suitable, depending upon whether or not the deviation between the component dimensions measured from the obtained image and the component dimensions extracted from the CAD data falls below a predetermined threshold. When the deviation exceeds the threshold, the computer 11 determines that the currently obtained image is unsuitable, returning to step 103 to repeat the process of obtaining an image of the subsequent component and calculating the component dimensions.

On the other hand, when the deviation falls below the threshold at step 104, the computer 11 determines that the currently obtained image is suitable, proceeding to step 105 to adjust the second component shape data (component dimensions) based on the component dimensions measured from the currently obtained image. The adjustment is carried out by an averaging process, P control or PI control.

The computer 11 then proceeds to step 106 to calculate a deviation, standard deviation and confidential interval of the component dimensions based on the second component shape data adjusted at step 105. Thereafter, the computer 11 proceeds to step 107 to adjust the confidential interval (tolerance) of the second component shape data according to the standard deviation.

The computer 11 then determines, at step 108, whether or not the component to be imaged (mounted) has been changed to another. When determining that the component to be imaged has not been changed, the computer 11 repeats processing at steps 103 to 107 thereby to repeat the processes of obtaining an image of a next component, calculating component dimensions and adjusting the confidential interval (tolerance) of the second component shape data.

Subsequently, the computer 11 terminates the program when determining at step 108 that the component to be imaged (mounted) has been changed to another. Thereafter, the computer 11 re-starts up the program to repeat the aforementioned processing for the changed component.

According to the foregoing embodiment, the image-processing component data is generated based on the first component shape data extracted from the CAD data and the second component shape data measured from the image obtained by imaging the component by the camera 12. Consequently, the image-processing component data can automatically be generated and has a higher reliability than the conventional component data.

Moreover, the first and second component shape data are compared with each other in the foregoing embodiment. The suitability of the obtained image depends upon whether or not the deviation between the first and second component shape data falls within the threshold. Consequently, the image-processing component data can be prevented from being generated by the use of the second component shape data which exceeds the threshold even when the second component shape data measured from the obtained images take different values, whereupon the reliability of the image-processing component data can further be improved.

Furthermore, every time the component is imaged by the camera 12 during operation of the component mounting apparatus, the second component shape data is measured from the obtained image so that the image-processing component data is adjusted. This processing is repeated. Consequently, the reliability of the image-processing component data can still further be improved.

The automatic generation of the image-processing component data needs to be executed at least before execution of component image processing. However, the image processing may be carried out at an initial stage of production with the use of the image-processing component data automatically generated from CAD data and the image-processing component data may automatically be tuned during production. In this case, the automatic tuning may be terminated after a predetermined number of components has been imaged.

A taken component image is generally affected by the influences of an illuminating source of each component mounting apparatus and/or adjustment of the camera 12. Accordingly, the dimensions of a component on the taken image thereof sometimes vary from those of the actual component. As a result, there is a possibility that image-processing component data automatically generated by one component mounting apparatus may be unsuitable for the use with another component mounting apparatus although suitable for the use with the one component mounting apparatus.

In view the aforementioned drawback, a host computer of a higher order may store only data of the component dimensions contained in the CAD data, and the component mounting apparatus may store data of the deviation between component dimensions on the taken image and data of the component dimensions on the CAD data and tolerance.

The image-processing component data generating device should not be limited to the use with the component mounting apparatus but may be used as a dedicated image-processing component data generating device discrete from the component mounting apparatus (a combination of desktop imaging device and personal computer).

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A method for generating mage-processing component data which is used for image-recognition of a component stuck to a suction nozzle of a component mounting apparatus, the method comprising:
    measuring second component shape data, via a control system of the component mounting apparatus, from an image of the component obtained by a camera imaging the component stuck to the suction nozzle of the component mounting apparatus; and
    generating image-processing component data, via the control system of the component mounting apparatus, including dimensions of the component and a tolerance corresponding to a width of an allowable variation range, based on the second component shape data and first component shape data which has been extracted from CAD data of the component,
    wherein a plurality of component shape data is measured from a plurality of obtained images respectively, and the image-processing component data is generated by use of the plurality of component shape data, and
    wherein the plurality of component shape data is statistically processed so that an allowable variation range is adjusted based on statistically processed values.

2. The method according to claim 1, wherein the first and second component shape data are compared with each other, and the image-processing component data is generated by use of the second component shape data when a deviation between the first and second component shape data falls within a predetermined range of values.

3. The method according to claim 1, wherein the second component shape data is measured from the obtained image every time the component is imaged by the camera during operation of the component mounting apparatus, so that the process of adjusting the image-processing component data is repeated.

4. The method according to claim 3, wherein the image-processing component data has an initial value that is generated based on the CAD data.

5. A device for generating image-processing component data which is used for image-recognition of a component stuck to a suction nozzle of a component mounting apparatus, the device comprising:
   a measuring unit, of the computer, which measures second component shape data from an image of the component obtained by a camera imaging the component stuck to a suction nozzle of the component mounting apparatus; and
   a generating unit, of the computer, which generates image-processing component data including dimensions of the component and a tolerance corresponding to a width of an allowable variation range, based on the second component shape data and first component shape data which has been extracted from CAD data of the component, wherein a plurality of component shape data is measured from a plurality of obtained images respectively, and the image-processing component data is generated by use of the plurality of component shape data, and wherein the plurality of component shape data is statistically processed so that an allowable variation range is adjusted based on statistically processed values, wherein the measuring unit and the generating unit are part of a control system of the corn orient mounting apparatus.

* * * * *